(12) United States Patent  (10) Patent No.: US 7,760,079 B2
Isono  (45) Date of Patent: Jul. 20, 2010

(54) TIRE-PRESSURE CONTROL APPARATUS (75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 12 days.

(21) Appl. No.: 12/090,455

(22) PCT Filed: Jun. 22, 2007

(86) PCT No.: PCT/JP2007/063061
§ 371 (c)(1),
(2), (4) Date: Apr. 16, 2008

(87) PCT Pub. No.: WO2008/001873
PCT Pub. Date: Jan. 3, 2008

(65) Prior Publication Data
US 2009/0223615 A1 Sep. 10, 2009

(30) Foreign Application Priority Data
Jun. 30, 2006 (JP) .............................. 2006-181134

(51) Int. Cl.
*B60C 23/02* (2006.01)
(52) U.S. Cl. .................. 340/442; 340/444; 137/226
(58) Field of Classification Search ................. 340/442, 340/444, 445, 438; 137/225, 226, 493.3, 137/493.4; 152/415, 416, 418; 73/146.5
See application file for complete search history.

(56) References Cited
U.S. PATENT DOCUMENTS 5,309,969 A * 5/1994 Mittal ........................ 152/415
5,411,051 A * 5/1995 Olney et al. ................. 137/225
5,413,159 A * 5/1995 Olney et al. ................. 152/418
5,540,268 A * 7/1996 Mittal ........................ 152/415
7,509,969 B2 * 3/2009 Huang ........................ 137/226
2005/0194080 A1  9/2005 White et al.

FOREIGN PATENT DOCUMENTS

| EP | 166123 | 1/1986 |
|---|---|---|
| EP | 0 343 990 | 11/1989 |
| EP | 0 344 002 | 11/1989 |
| EP | 0 542 728 | 5/1993 |
| EP | 0 601 556 | 6/1994 |
| JP | 7 137 515 | 5/1995 |

* cited by examiner

*Primary Examiner*—Van T. Trieu
(74) *Attorney, Agent, or Firm*—Oblon, Spivak, McClelland, Maier & Neustadt, L.L.P.

(57) ABSTRACT

A tire-pressure control apparatus includes an air pump AP capable of supplying compressed air to a tire air chamber Rb, a mechanical control valve device VA which permits and prohibits supply of compressed air from the air pump AP to the tire air chamber Rb, a valve-state detection sensor (stroke sensor S1) for detecting the state of the control valve device VA, and an electric control apparatus ECU. The electric control apparatus ECU includes time measurement for measuring a pressure increasing time which is a time period starting when the supply of compressed air from the air pump AP to the tire air chamber Rb is started and ending when the supply of compressed air is stopped, and a pressure decreasing time which is a time period starting when the supply of compressed air is stopped and ending when the supply of compressed air is started (resumed). And discharged-air-flow-rate calculation for calculating a flow rate of air discharged from the air pump to the tire air chamber from the pressure decreasing time and the pressure increasing time.

4 Claims, 6 Drawing Sheets

TIRE-PRESSURE CONTROL APPARATUS

TECHNICAL FIELD

The present invention relates to a tire-pressure control apparatus which includes an air pump capable of supplying compressed air to a tire air chamber of a wheel assembly, and a control valve device disposed in an air passageway extending between the air pump and the tire air chamber and adapted to control the tire pressure within the tire air chamber.

BACKGROUND ART

A tire-pressure control apparatus of such a type is disclosed in, for example, Japanese Patent Application Laid-Open (kokai) No. H7-137515.

In the tire-pressure control apparatus disclosed in the above-mentioned publication, a pressure sensor capable of detecting tire pressure is disposed in an air passageway extending between a tire air chamber and a control valve device, and operation of the control valve device is electrically controlled on the basis of the pressure detected by means of the pressure sensor. The tire-pressure control apparatus can operate an air pump and bring the control valve device into an open state (a state in which compressed air is supplied from the air pump to the air passageway in which the pressure sensor is disposed) with a manual cock disposed between the pressure sensor and the tire air chamber closed; sense a change in the air pressure within the air passageway at the time by use of the pressure sensor; and determine that an anomaly, such as leakage of air, has occurred in the air passageway when the rate of air pressure increase is slower than a predetermined rate.

However, the determination as to whether or not an anomaly, such as leakage of air, has occurred is performed under the assumption that the air pump operates normally. Therefore, if the air pump does not operation normally (for example, the air discharging function of the air pump has deteriorated), such a state (the discharge anomaly of the air pump) cannot be detected. In such case, despite occurrence of an air leakage anomaly, the rate of air pressure increase becomes slower than the predetermined rate, leading to an erroneous determination.

DISCLOSURE OF THE INVENTION

An object of the present invention is to provide a tire-pressure control apparatus which can detect a discharge anomaly of an air pump without use of a pressure sensor.

The present invention provides a tire-pressure control apparatus which comprises an air pump capable of supplying compressed air to a tire air chamber of a wheel assembly, and a mechanical control valve device disposed in an air passageway extending between the air pump and the tire air chamber and adapted to control a tire pressure within the tire air chamber. During a period over which the tire pressure increases to an upper limit set value from a lower limit set value after having decreased to the lower limit set value, the control valve device is in a permission state where the control valve device permits supply of compressed air from the air pump to the tire air chamber. During a period over which the tire pressure decreases to the lower limit set value from the upper limit set value after having increased to the upper limit set value, the control valve device is in a prohibition state where the control valve device prohibits supply of compressed air from the air pump to the tire air chamber. The tire-pressure control apparatus further comprises a value state detection sensor for detecting whether the control valve device is in the permission state or the prohibition state; time measurement means for measuring a pressure decreasing time, which is a time period starting when the control valve device enters the prohibition state and ending when the control valve device enters the permission state and a pressure increasing time, which is a time period starting when the control valve device enters the permission state and ending when the control valve device enters the prohibition state; and discharged-air-flow-rate calculation means for calculating a flow rate of air discharged from the air pump to the tire air chamber from the pressure decreasing time and the pressure increasing time.

The discharged-air-flow-rate calculation means may includes air-quantity-increasing-rate calculation means for calculating an air quantity increasing rate, which is a rate of increase in the quantity of air within the pneumatic circuit, including the tire air chamber, during the pressure increasing time, from the pressure increasing time and an air quantity difference, which is the difference between an amount of air remaining within the pneumatic circuit when the control valve device enters the prohibition state and an amount of air remaining within the pneumatic circuit when the control valve device enters the permission state; air-quantity-decreasing-rate calculation means for calculating an air quantity decreasing rate, which is a rate of decrease in the quantity of air within the pneumatic circuit during the pressure decreasing time, from the pressure decreasing time and the air quantity difference; and supplied-air-flow-rate calculation means for calculating a flow rate of air discharged from the air pump toward the tire air chamber on the basis of the air quantity increasing rate and the air quantity decreasing rate.

Since the tire-pressure control apparatus according to the present invention includes discharged-air-flow-rate calculation means which calculates a flow rate of air discharged from the air pump to the tire air chamber from the pressure decreasing time and the pressure increasing time, the flow rate of air discharged from the air pup can be obtained, and the discharge function (capacity) of the air pump can be determined from this air flow rate (discharged-air flow rate). Further such determination can be performed without use of a pressure sensor, and thus can be performed at low cost.

In the tire-pressure control apparatus according to the present invention, the air quantity decreasing rate, which is the rate of decrease in the quantity of air within the pneumatic circuit, including the tire air chamber (a flow rate of air leaking from the pneumatic circuit), can be calculated from the pressure decreasing time, and an air-leakage anomaly of the pneumatic circuit, including the tire air chamber, can be detected on the basis of the air quantity decreasing rate.

The present invention may be embodied to include flow-rate determination means for determining whether or not the flow rate of air discharged from the air pump to the tire air chamber is greater than a set value; and announcing means for announcing results of determination by the flow-rate determination means. In this case, the state (normal or anomalous) of the discharge function of the air pump can be reported to a driver by the announcing means.

BEST MODE FOR CARRYING OUT THE INVENTION

Figure 1:
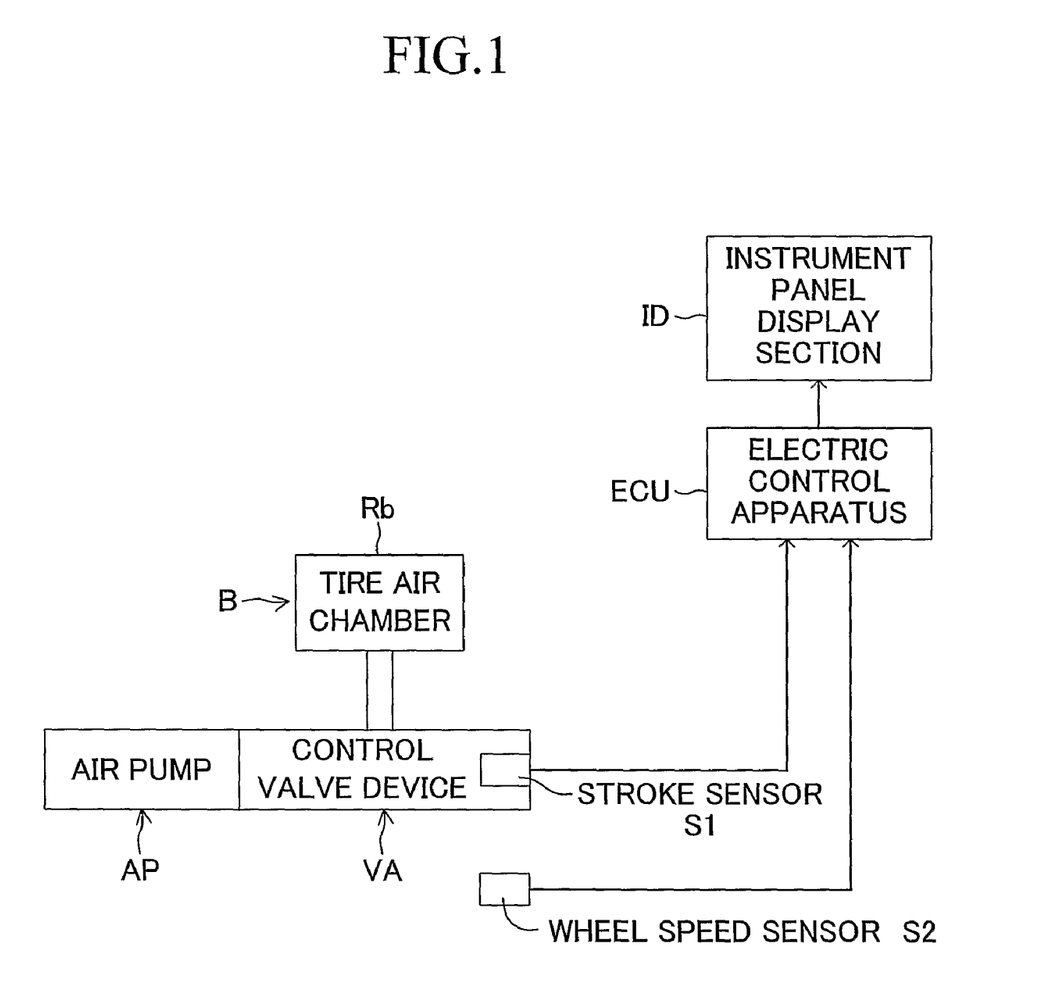
FIG. 1 is a block diagram schematically showing one embodiment of a tire-pressure control apparatus according to the present invention.

An embodiment of the present invention will next be described with reference to the drawings. FIG. 1 schematically shows a tire-pressure control apparatus according to the present invention. This tire-pressure control apparatus includes an air pump AP capable of supplying compressed air to a tire air chamber Rb (formed by a wheel B1 and a tire B2 shown in FIG. 2) of a wheel assembly B via a control valve device VA.

Figure 2:
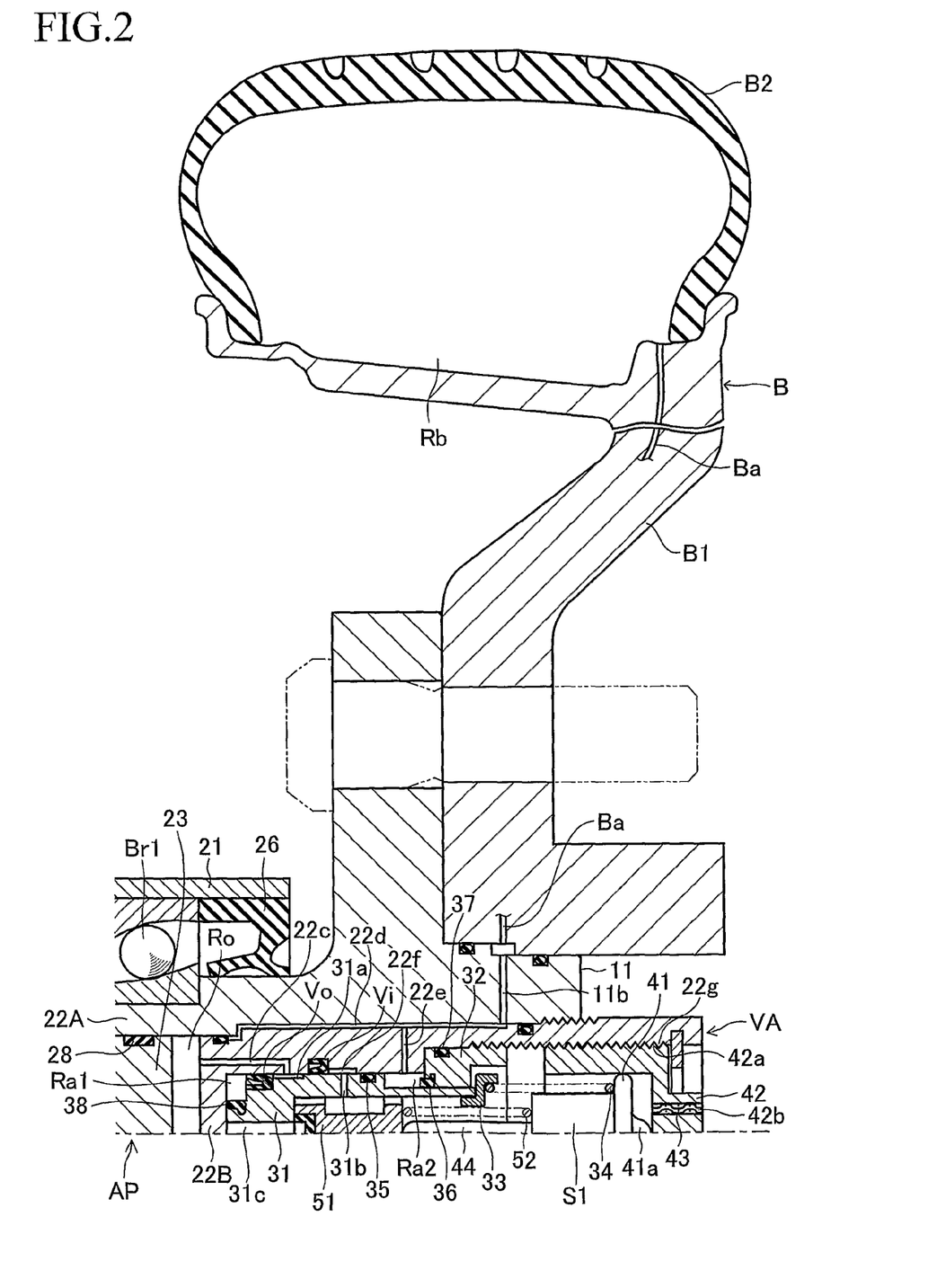
FIG. 2 is a detailed vertical sectional view showing portions of a tire air chamber, an air pump, and a control valve device shown in FIG. 1.
Figure 3:
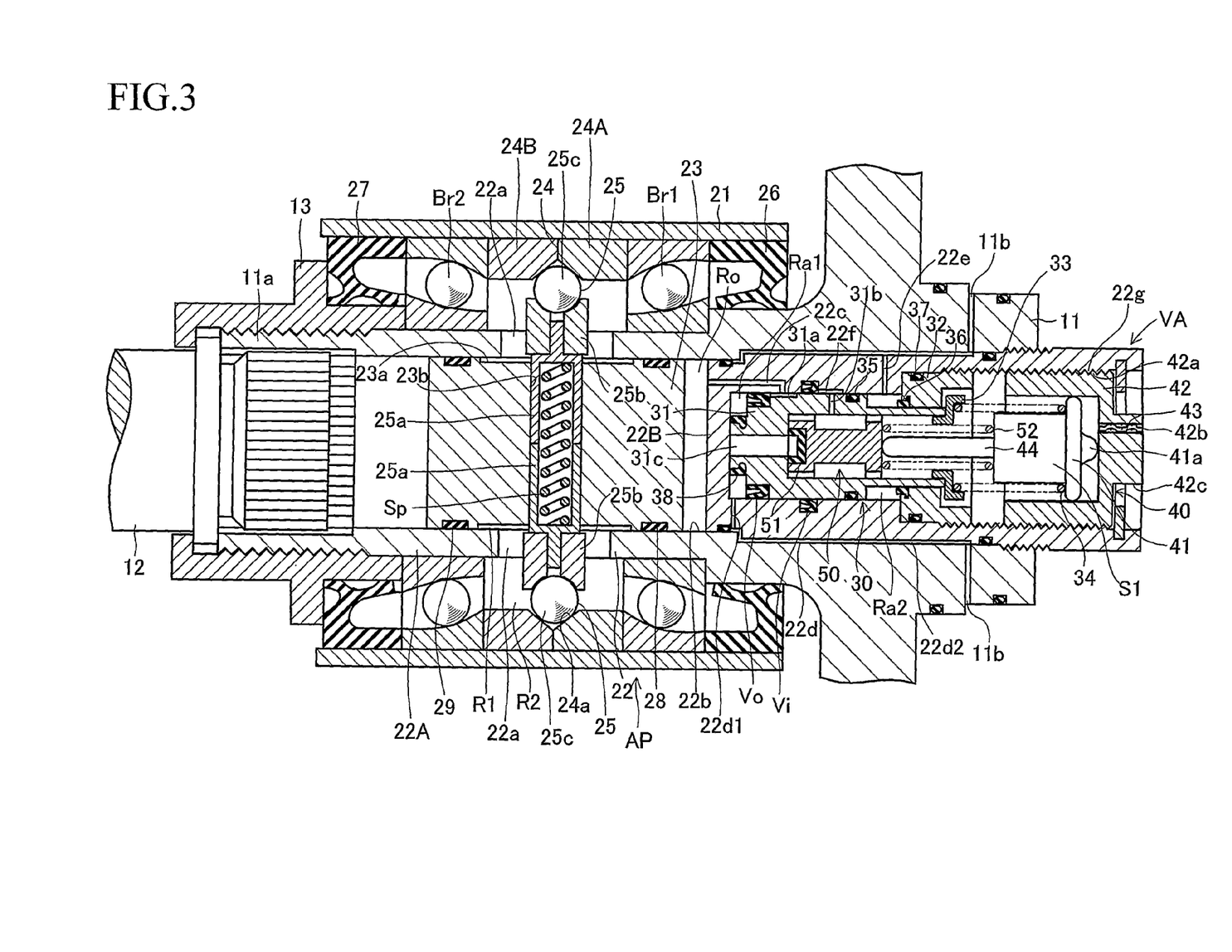
FIG. 3 is a sectional view of the air pump and the control valve device shown in FIGS. 1 and 2.

As shown in FIGS. 2 and 3 in detail, the air pump AP and the control valve device VA are attached to an axle hub 11 which rotates with the wheel assembly B. A driving axle 12 is splined to the inboard end of the axle hub 11, whereby the axle hub 11 and the driving axle 12 are connected for torque transmission. The connection between the axle hub 11 and the driving axle 12 is ensured by means of a lock nut 13.

The air pump AP (may be referred to as an air compressor) generates compressed air through adiabatic compression of atmospheric air. The air pump AP is driven as the wheel assembly B rotates, and is stopped as the wheel assembly B stops. The air pump AP can supply compressed air generated according to the rotation of the wheel assembly B, to the tire air chamber Rb of the wheel assembly B via a pressure control valve 30. The air pump AP includes a nonrotatable cylindrical member 21, a rotatable cylinder 22 formed on a shaft portion 11a of the axle hub 11, a piston 23 which can reciprocate, a cam member 24, and a pair of cam followers 25.

The cylindrical member 21 is supported nonrotatably by a support member (not shown). The cylinder 22 is supported in the interior of the cylindrical member 21 rotatably about the axis of the wheel assembly B and liquid-tightly via a pair of bearings Br1 and Br2 and a pair of annular seal members 26 and 27. The paired bearings Br1 and Br2 are spaced a predetermined distance apart from each other in the axial direction and intervene between the cylindrical member 21 and the cylinder 22 while sandwiching the cam member 24 therebetween in the axial direction, thereby enabling rotation of the cylinder 22 in relation to the cylindrical member 21. The paired annular seal members 26 and 27 are spaced a predetermined distance apart from each other in the axial direction and intervene between the cylindrical member 21 and the cylinder 22 while sandwiching the cam member 24 and the bearings Br1 and Br2 therebetween in the axial direction, thereby providing a liquid-tight seal between the cylindrical member 21 and the cylinder 22.

The cylinder 22 includes a cylinder body 22A and a cylinder head 22B, which is airtightly and removably screw-engaged with the outboard end portion of the cylinder body 22A. The cylinder body 22A is integrally formed on the shaft portion 11a of the axle hub 11, and includes a pair of axially elongated holes 22a and a cylinder bore 22b extending in the axial direction of the cylinder 22. The cylinder head 22B is a closed-bottomed tubular stopper member airtightly and removably attached to the axle hub 11, and includes a suction-discharge path 22c, a discharge path 22d, a pressure introduction path 22e, and a suction path 22f.

The paired axially elongated holes 22a collectively serve as a guide means for guiding the piston 23 and the cam followers 25 in such a manner that these members are rotatable unitarily with the cylinder 22 and can reciprocate in the axial direction of the piston 23. The paired axially elongated holes 22a are spaced 180 degrees apart from each other in the circumferential direction of the cylinder 22. The cylinder bore 22b accommodates the piston 23. The outboard end portion of the cylinder bore 22b is blocked by the cylinder head 22B. The cylinder bore 22b, in cooperation with the cylinder head 22B and the piston 23, forms a pump chamber Ro.

The suction-discharge path 22c always communicates with a communication path 31a provided in a valve body 31 of the pressure control valve 30. The suction-discharge path 22c can lead air into the pump chamber Ro through a suction check valve Vi (formed by an annular seal member having a V-shaped cross section) attached to the cylinder head 22B, and can lead air from the pump chamber Ro through a discharge check valve Vo (formed by an annular seal member having a V-shaped cross section) attached to the valve body 31 of the pressure control valve 30.

The discharge path 22d leads compressed air discharged into an air chamber Ra1 via the discharge check valve Vo, into a discharge path 11b provided in the axle hub 11. The discharge path 22d includes a communication hole 22d1 provided in the cylinder head 22B and extending in a radial direction thereof and a communication groove 22d2 provided on the outer circumference of the cylinder head 22B. As shown in FIG. 2, the discharge path 11b provided in the axle hub 11 communicates with the tire air chamber Rb through a communication path Ba provided in the wheel B1.

The pressure introduction path 22e is a communication hole provided in the cylinder head 22B and extending in a radial direction of the cylinder head 22B. The pressure introduction path 22e is adapted to introduce the pressure of compressed air in the discharge path 22d into an air chamber Ra2 formed between the valve body 31 of the pressure control valve 30 and a stopper 32. The suction path 22f always communicates with an atmosphere communication path 31b provided in the valve body 31 of the pressure control valve 30. The communication between the suction path 22f and the communication path 31a provided in the valve body 31 of the pressure control valve 30 can be established and cut off. The atmosphere communication path 31b provided in the valve body 31 always communicates with the atmosphere through an atmosphere communication path 42b formed in an adjusting screw 42 of a regulator 40.

The piston 23 is inserted into the cylinder bore 22b of the cylinder 22 via a pair of annular seal members 28 and 29 and is attached to the cylinder 22 in a unitarily rotatable manner and in such a manner as to be able to axially reciprocate. The piston 23 has an annular groove 23a and a through hole 23b extending in a radial direction thereof. The paired annular seal members 28 and 29 are spaced a predetermined distance apart from each other in the axial direction of the piston 23 and intervene between the piston 23 and the cylinder 22 at respective, axial end portions of the piston 23, thereby providing an airtight, liquid-tight seal between the piston 23 and the cylinder 22.

The annular groove 23a is formed on the outer circumference of the piston 23 between the paired annular seal members 28 and 29, whereby an annular space R1 is formed between the piston 23 and the cylinder 22. The annular space R1 communicates with an annular space R2 formed between the paired annular seal members 26 and 27, through the axially elongated holes 22a formed in the cylinder 22. The annular spaces R1 and R2 remain unchanged in volume during axial reciprocating motion of the piston 23 and are sealed by means of the four seal members 26, 27, 28, and 29. The annular spaces R1 and R2 and the like collectively serve as an oil chamber for accommodating a predetermined amount of lubrication oil. This oil chamber accommodates the bearings Br1 and Br2, the cam member 24, the cam followers 25, a compression coil spring Sp, and the like.

The cam member 24 consists of a pair of cam sleeves 24A and 24B, which are provided in contact with each other in the axial direction of the piston 23, and is attached unitarily (in an axially immovable manner and in a nonrotatable manner) to the cylindrical member 21. The cam member 24 is disposed coaxially with the cylinder 22. The cam member 24 has an annular cam portion 24a whose axial position varies. The cam portion 24a is a cam groove, into which a ball 25c of each cam follower 25 is fitted. The cam portion 24a has a cam face which receives a load along the axial direction of the piston (a load along the horizontal direction in FIG. 3) and a load along the radial direction of the piston (a load along the vertical direction in FIG. 3) from the ball 25c of the cam follower 25. This cam face has a V-shaped cross section and has an even number of geometric cycles (e.g., two geometric cycles) along the circumferential direction of the cylinder 22.

The cam followers 25 each include a shaft 25a divided into two pieces within the piston 23, and a roller 25b and the ball 25c attached to the shaft 25a. The shaft 25a of each of the followers 25 is installed in the through hole 23b of the piston 23 in such a manner as to be movable in a radial direction of the piston 23. The cam followers 25 each are engaged with the cam portion (cam groove) 24a of the cam member 24, at the end portion extending in the piston radial direction (that is, at the ball 25c). Through relative rotation in relation to the cam member 24, the cam followers 25 can move in the axial direction of the piston 23.

The shafts 25a each serve as a load transmission element, which is installed in the through hole 23b of the piston 23 in such a manner as to be movable in the radial direction of the piston 23 (the axial direction of the through hole 23b). The compression coil spring Sp is installed within the shafts 25a and applies force to the shafts 25a in a radially outward direction of the piston 23. The shafts 25a are support bodies which rotatably support the rollers 25b. The rollers 25b are rotatably supported at respective small-diameter end portions projecting from the through hole 23b of the piston 23.

While being rotatably fitted to the respective small-diameter end portions of the shafts 25a, the rollers 25b are rollably fitted into the respective axially elongated holes 22a of the cylinder 22. The rollers 25b can roll along the respective axially elongated holes 22a of the cylinder 22 in association with the axial movement of the cam followers 25. Each of the rollers 25b has a hemispherically recessed bearing portion at its axially outer end. The bearing portions of the rollers 25b rollably support the respective balls 25c.

Each of the balls 25c is a protruded portion of the cam follower 25, which is rollably supported by the roller 25b and is rollably engaged with the cam portion (cam groove) 24a of the cam member 24. Each of the balls 25c is subject to repulsion force of the compression coil spring Sp via the shaft 25a and the roller 25b, and is resiliently engaged with the cam portion (cam groove) 24a of the cam member 24 without clearance.

The compression coil spring Sp is a pressing means for pressing the balls 25c of the cam followers 25 in a radial direction of the piston 23 toward the cam portion (cam groove) 24a of the cam member 24. The compression coil spring Sp is installed in closed-bottomed mounting holes of the shafts 25a of the cam followers 25 under predetermined preload.

In the thus-configured air pump AP, when the cylinder 22 (the axle hub 11) rotates with the valve body 31 of the pressure control valve 30 maintained in the position shown in FIGS. 2 and 3, the piston 23 and the cam followers 25 rotate unitarily with the cylinder 22 and undergo relative rotation in relation to the cam member 24 to thereby move axially. Accordingly, the rotary motion of the cylinder 22 can be converted to the reciprocating motion of the piston 23. The reciprocating motion of the piston 23 can increase and decrease the volume of the pump chamber Ro. Thus, air can be introduced into the pump chamber Ro through the atmosphere communication path 31b which always communicates with the atmosphere, the suction path 22f, the suction check valve Vi, the communication path 31a, and the suction-discharge path 22c. Also air can be discharged from the pump chamber Ro through the suction-discharge path 22c, the communication path 31a, and the discharge check valve Vo (that is, compressed air to be supplied into the tire air chamber Rb can be generated).

The control valve device VA is a mechanical control valve which is disposed in an air passageway between the air pump AP and the tire air chamber Rb, as shown in FIG. 2, and which operates in accordance with the tire pressure; i.e., the air pressure within the tire air chamber Rb, and includes the pressure control valve 30, the regulator 40, and a relief valve 50 which is coaxially disposed within the pressure control valve 30. The control valve device VA and the air pump AP are coaxially disposed in the shaft portion (rotational shaft) 11a of the axle hub 11.

The pressure control valve 30 is installed into the cylinder head 22B and includes the valve body 31, the stopper 32, and a compression coil spring 34. The compression coil spring 34 is engaged with the valve body 31 via a spring retainer 33 and can control moving timing and moving position of the valve body 31. Urging force (spring force) of the compression coil spring 34 which is applied to the valve body 31 can be adjusted by the regulator 40. When the air pressure (P) of the tire air chamber Rb has decreased to a lower limit set value P1, the pressure control valve 30 changes its state from an operation state (a state where the valve body 31 has moved from the position shown in FIGS. 2 and 3 against urging forces of the compression spring 34 and a compression spring 52 by a predetermined distance) to a state shown in FIGS. 2 and 3, whereby compressed air can be supplied from the pump chamber Ro to the tire air chamber Rb. When the pressure of the compressed air supplied from the pump chamber Ro to the tire air chamber Rb increases to an upper limit set value P2 (P1<P2), the pressure control valve 30 changes its state from the state shown in FIGS. 2 and 3 to the operation state, whereby the compressed air supplied from the pump chamber Ro to the tire air chamber Rb can be restricted (stopped).

The valve body 31 is airtightly installed in the cylinder head 22B via the discharge check valve Vo and an annular seal member 35, both attached to the outer circumference of the valve body 31, in such a manner as to be movable in the axial direction of the cylinder 22. The air chamber Ra1 which communicates with the discharge path 22d is formed between the valve body 31 and the cylinder head 22B. The air chamber Ra2 which communicates with the discharge path 22d via the pressure introduction path 22e is formed between the valve body 31 and the stopper 32. An annular seal member 36 is attached to the inner circumference of the stopper 32, and an annular seal member 37 is attached to the outer circumference of the stopper 32. The stopper 32 is airtightly interposed between the cylinder head 22B and the valve body 31 and is integrally screw-engaged with the cylinder head 22B at the outboard end portion of the outer circumference thereof.

The air chamber Ra1 always communicates with the tire air chamber Rb via the discharge path 22d, the discharge path 11b, and the communication path Ba. The air chamber Ra2 always communicates with the tire air chamber Rb via the pressure introduction path 22e, the discharge path 22d, the discharge path 11b, and the communication path Ba. A pressure-receiving area of the valve body 31 exposed to the air chamber Ra1 is set to be larger than that of the valve body 31 exposed to the air chamber Ra2 by a predetermined area.

In the pressure control valve 30, until the air pressure (P) of the tire air chamber Rb increases to the upper limit set value P2 from the lower limit set value P1 to which the pressure has dropped, the valve body 31 is maintained at the position shown in FIGS. 2 and 3, and the communication between the communication path 31a and the suction path 22f is cut off by the suction check valve Vi. Thus, in the illustrated state, while the suction check valve Vi permits air flow from the atmosphere into the pump chamber Ro and the discharge check valve Vo permits air flow from the pump chamber Ro into the tire air chamber Rb, the suction check valve Vi cuts off the communication between the communication path 31a and the suction path 22f to thereby restrict air flow from the pump chamber Ro to the atmosphere, and the discharge check valve Vo restricts air flow from the tire air chamber Rb to the pump chamber Ro. Therefore, in the above-described state (a permission state where the pressure control valve 30 permits compressed air to be supplied from the air pump AP to the tire air chamber Rb), the reciprocation of the piston 23 associated with the rotation of the wheel assembly B causes atmospheric air to be introduced into the pump chamber Ro and compressed air to be discharged from the pump chamber Ro to the tire air chamber Rb.

In the pressure control valve 30, during a period in which the air pressure (P) of the tire air chamber Rb decreases to the lower limit set value P1 from the upper limit set value P2 to which the pressure has increased, the valve body 31 maintains its axial position shifted from the illustrated position by a predetermined amount, against the urging forces of the compression coil springs 34 and 52, so that the communication path 31a communicates with the suction path 22f irrespective of the presence of the suction check valve Vi. Therefore, the suction check valve Vi has lost its function (reverse-flow prevention function), whereby the communication path 31a communicates with the suction path 22f to thereby permit the air flow between the pump chamber Ro and the atmosphere. Furthermore, the discharge check valve Vo restricts air flow between the discharge path 22d and the communication path 31a; that is, between the pump chamber Ro and the tire air chamber Rb. In a state (an operation state) where the valve body 31 maintains its axial position shifted from the illustrated position by a predetermined amount against the urging forces of the compression coil springs 34 and 52, the shoulder portion of the valve body 31 is in contact with the annular seal member 36 attached to the inner circumference of the stopper 32. Thus, in this state (a prohibition state where the pressure control valve 30 prohibits the supply of compressed air from the air pump AP to the tire air chamber Rb), even when the piston 23 reciprocates as a result of rotation of the wheel assembly B, air once introduced into the pump chamber Ro is pushed back to the atmosphere. Thus, no compressed air is discharged from the pump chamber Ro to the tire air chamber Rb.

The regulator 40 includes a spring support 41 which supports the other end portion (a fixed end portion which does not move even when the valve body 31 moves) of the compression coil spring 34 of the pressure control valve 30; and the adjusting screw 42, which can adjust the position of the spring support 41. The spring support 41 can move as the adjusting screw 42 moves. A hemispherically protruded portion 41a of the spring support 41 is rotatably engaged with the adjusting screw 42.

The adjusting screw 42 is a separate member from the spring support 41, and includes a male thread portion 42a and the atmosphere communication path 42b. The male thread portion 42a of the adjusting screw 42 is screw-engaged with a female screw portion 22g of the cylinder head 22B in such a manner as to be able to advance and retreat. The adjusting screw 42 also serves as a cap, and can be rotated from the outside of the vehicle for adjustment. A hexagonal head portion 42c is formed on the outer end portion of the adjusting screw 42 such that a manually operable adjusting tool (not shown) can be removably attached thereto. A filter 43 is disposed in the atmosphere communication path 42b.

The relief valve 50 is adapted to release compressed air to the atmosphere when the pressure of compressed air supplied from the pump chamber Ro to the tire air chamber Rb; that is, the air pressure (P) within the air chamber Ra1, is equal to or higher than a relief pressure P3 which is higher than the upper limit set value P2. The relief valve 50 includes a valve body 51 which can open and close a relief path 31c provided in the valve body 31; and the compression coil spring 52 whose one end portion (a movable end portion) is engaged with the valve body 51 and which determines the timing at which the valve body 51 moves (i.e., the timing at which the relief path 31c is opened).

The valve body 51 is installed in the valve body 31 of the pressure control valve 30 in such a manner as to be movable in the axial direction of the cylinder 22. The valve body 51 is in contact with a rod portion 44 of the stroke sensor S1 (the rod portion can undergo relative movement in the axial direction of the cylinder 22 with very little resistance when the position of the spring support 41 is adjusted by means of the adjusting screw 42). The other end portion (fixed end portion) of the compression coil spring 52 is engaged with the above-described spring support 41. The urging force of the compression coil spring 52 which acts on the valve body 51 can be adjusted by means of the regulator 40. At the time of adjustment by means of the regulator 40, the urging force of the compression coil spring 34 which acts on the valve body 31 of the pressure control valve 30 is also adjusted. Thus, the above-described upper limit set value P2 and relief pressure P3 can be adjusted simultaneously.

In the relief valve 50, the communication of the relief path 31c provided in the valve body 31 of the pressure control valve 30 with the air chamber Ra1 can be established and cut off by means of an annular seal member 38 attached to the valve body 31. Thus, only when the valve body 31 of the pressure control valve 30 moves against the urging force of the compression coil springs 34 and 52 and then the air chamber Ra1 communicates with the relief path 31c irrespective of presence of the seal member 38, the pressure within the air chamber Ra1 is introduced into the relief path 31c, whereby the relief valve 50 operates.

The stroke sensor S1 is a valve-state detection sensor for detecting whether the pressure control valve 30 is in a permission state (illustrated state) or a prohibition state (operation state). The stroke sensor S1 includes the rod portion 44 which detects movement of the valve body 31 of the pressure control valve 30 via the valve body 51 of the relief valve 50;

and an internal switch (not shown) which is provided in the spring support 41 and is turned ON and OFF by the rod portion 44.

In the stroke sensor S1, when the pressure control valve 30 is in the permission state, the internal switch is maintained in the OFF state, and outputs a Low signal; and when the pressure control valve 30 is in the prohibition state, the internal switch is maintained in the ON state, and outputs a High signal. The signal output from the stroke sensor S1 is input by radio into the electric control apparatus ECU shown in FIG. 1.

As shown in FIG. 1, the electric control apparatus ECU can receive an output of the stroke sensor S1 and an output of a wheel speed sensor S2, which can detect rotational speed of the wheel assembly B. Further, the electric control apparatus ECU is electrically connected to an instrument panel display section ID which can display messages "Air Leakage: Normal" and "Air Leakage: Anomalous" for the pneumatic circuit including the tire air chamber Rb and messages "Discharge Function: Normal" and "Discharge Function: Anomalous" for the air pump AP.

Figure 4:
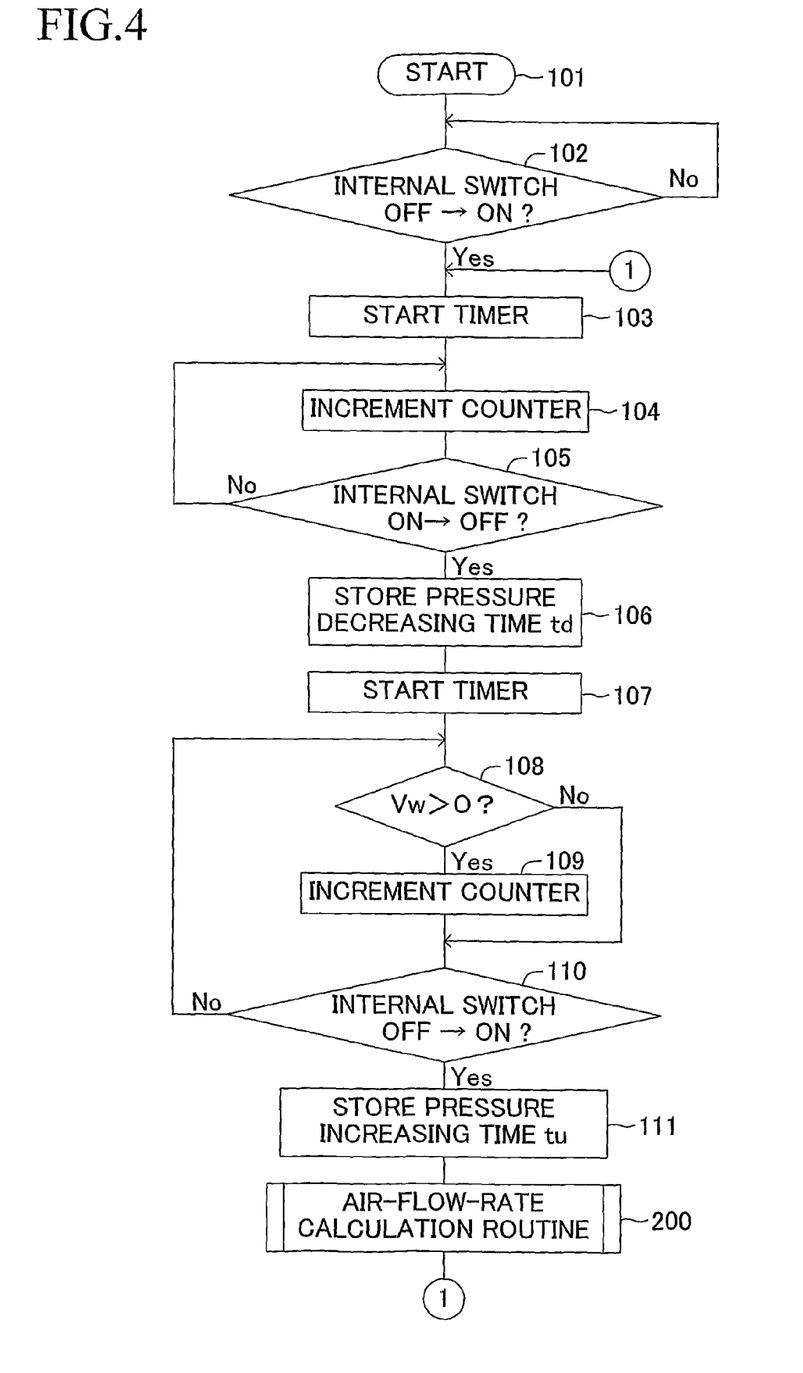
FIG. 4 is a flowchart showing a program routine which is executed by a microcomputer of an electric control apparatus shown in FIG. 1.
Figure 5:
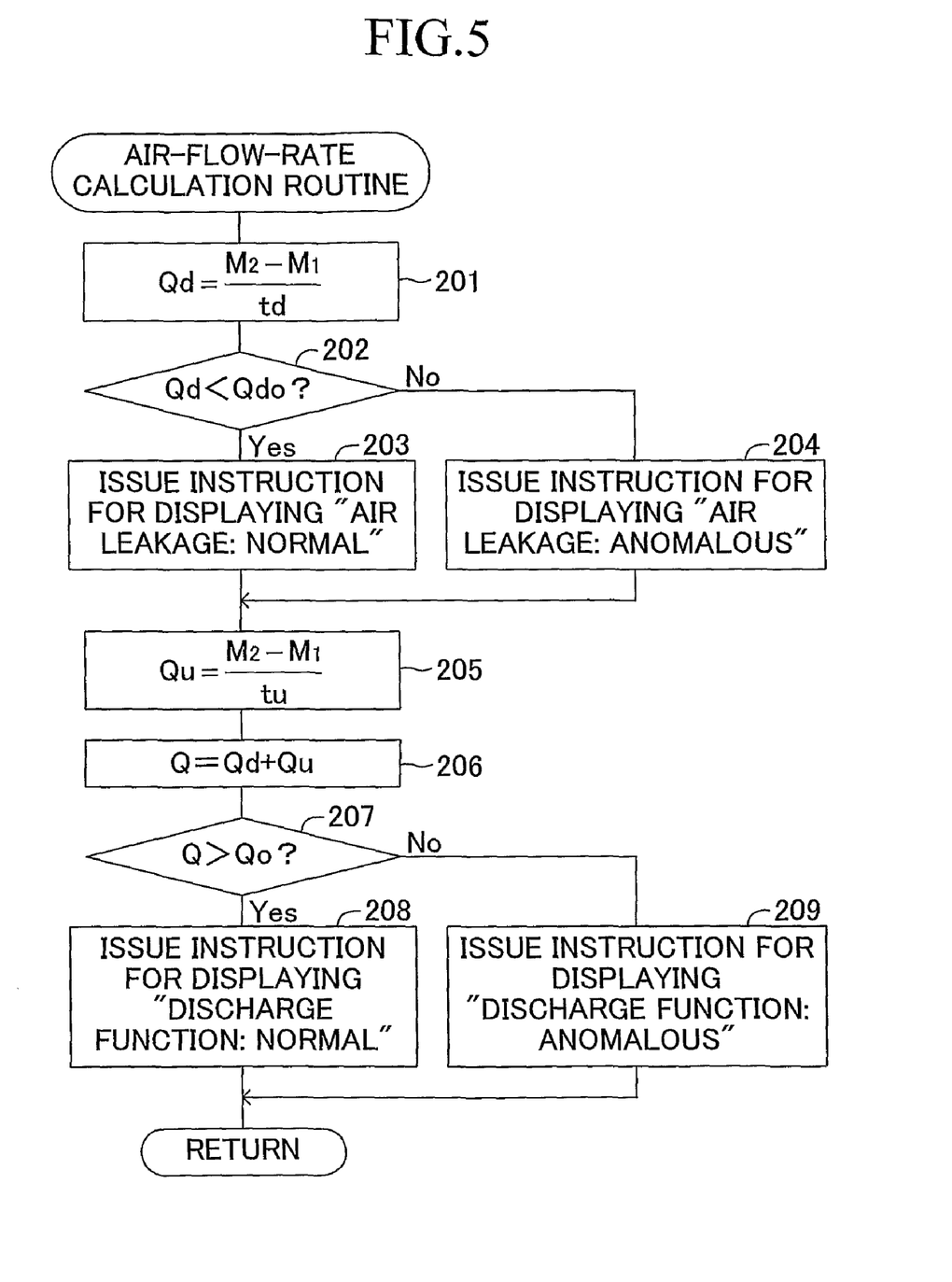
FIG. 5 is a flowchart showing a subroutine which is executed by the microcomputer of FIG. 1.

Further, the electric control apparatus ECU includes a microcomputer which performs a program corresponding to flowcharts of FIGS. 4 and 5, on the basis of the outputs of the stroke sensor S1 and the wheel speed sensor S2. The electric control apparatus ECU can measure (calculate) a pressure decreasing time (td) between a point in time at which the pressure control valve 30 enters the prohibition state (see, for example, time t1 in FIG. 6) and a point in time at which the pressure control valve 30 enters the permission state (see time t2 in FIG. 6), and can measure (calculate) a pressure increasing time (tu) between a point in time at which the pressure control valve 30 enters the permission state (see time t2 in FIG. 6) and a point in time at which the pressure control valve 30 enters the prohibition state (see time t3 in FIG. 6).

Figure 6:
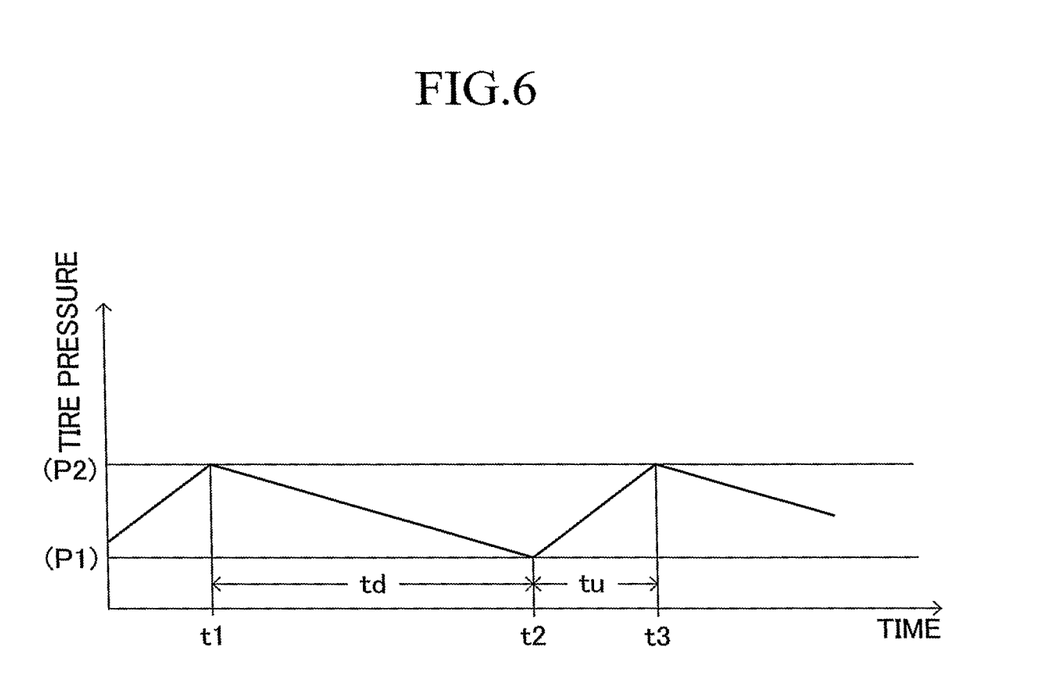
FIG. 6 is a time chart showing the relation between tire pressure and time in the embodiment shown in FIGS. 1 to 5.

The electric control apparatus ECU can calculate an air quantity increasing rate Qu, which is a rate of increase of the air quantity within the pneumatic circuit (an increase in weight of air per unit time) during the pressure increasing time (tu), from an air quantity difference (M2−M1) and the pressure increasing time (tu), the air quantity difference (M2−M1) being the difference between a quantity M2 of air remaining in the pneumatic circuit, including the tire air chamber Rb, at the time the pressure control valve 30 enters the prohibition state (see time t1 or t3 in FIG. 6) and a quantity M1 of air remaining in the pneumatic circuit at the time the pressure control valve 30 enters the permission state (see time t2 in FIG. 6). Further, the electric control apparatus ECU can calculate an air quantity decreasing rate Qd, which is a rate of decrease of the air quantity within the pneumatic circuit (a decrease in weight of air per unit time) during the pressure decreasing time (td), from the above-mentioned air quantity difference (M2−M1) and the pressure decreasing time (td).

The above-described remaining air quantities M1 and M2 are previously calculated by use of the state equation P·V=M·R·T of gas, wherein P is "absolute pressure," T is "absolute temperature," M is the "weight of air," V is the "volume of the pneumatic circuit including the tire air chamber Rb," and R is the "gas constant of air." T, V, and R are assumed to have been empirically or analytically obtained in advance in consideration of use conditions or the like and not to vary (that is, they are constants). Therefore, the remaining air amount M1 is calculated on the basis of an absolute pressure corresponding to the lower limit set value P1 and the above-mentioned T, V, and R; and the remaining air amount M2 is calculated on the basis of an absolute pressure corresponding to the lower limit set value P2 and the above-mentioned T, V, and R.

Further, the electric control apparatus ECU can calculate a flow rate Q of air discharged from the air pump AP toward the tire air chamber Rb (the weight of air discharged from the air pump per unit time) from the air quantity increasing rate Qu, which is calculated from the air quantity difference (M2−M1) and the pressure increasing time (tu), and the air quantity decreasing rate Qd, which is calculated from the air quantity difference (M2−M1) and the pressure decreasing time (td). Since the air quantity difference (M2−M1) is calculated in advance by use of the state equation P·V=M·R·T of gas, virtually, the flow rate Q of air discharged from the air pump AP toward the tire air chamber Rb can be calculated from the pressure decreasing time (td) and the pressure increasing time (tu).

Moreover, the electric control apparatus ECU can determine whether or not the air quantity decreasing rate Qd is less than a set value Qdo, and display the results of the determination on the instrument panel display section ID. In addition, the electric control apparatus ECU can determine whether or not the discharged air flow rate Q is greater than a set value Qo, and display the results of the determination on the instrument panel display section ID.

In the present embodiment having the above-described configuration, when an unillustrated main switch (e.g., an ignition switch) of the vehicle is brought from an OFF state to an ON state, the microcomputer in the electric control apparatus ECU starts a program corresponding to the flowchart of FIG. 4 from Step 101, and proceeds to Step 102 so as to determine whether or not the internal switch of the stroke sensor S1 has been switched from the OFF state to the ON state, on the basis of a signal output from the stroke sensor S1. When the microcomputer makes a "No" determination in Step 102, the microcomputer repeats Step 102. When the microcomputer makes a "Yes" determination in Step 102, the microcomputer performs Steps 103 to 105 successively.

Therefore, until the pressure control valve 30 is switched from the permission state (OFF state) to the prohibition state (ON state) after the start of execution of the program (e.g., until time t1 of FIG. 6 comes), Step 102 is repeatedly executed, and when the time t1 of FIG. 6 is reached, Steps 103 to 105 are executed successively.

In Step 103, the microcomputer of the electric control apparatus ECU starts an internal timer. In Step 104, the count value of the timer is incremented so as to measure the time elapsed after execution of Step 103. In Step 105, the microcomputer of the electric control apparatus ECU determines whether or not the internal switch of the stroke sensor S1 has been switched from the ON state to the OFF state, on the basis of the signal output from the stroke sensor S1. When the microcomputer makes a "No" determination in Step 105, the microcomputer repeats Steps 104 and 105. When the microcomputer makes a "Yes" determination in Step 105, the microcomputer performs Steps 106 to 108 successively.

Therefore, until the pressure control valve 30 is switched from the prohibition state (ON state) to the permission state (OFF state) after time t1 of FIG. 6; i.e., until time t2 of FIG. 6 comes, Steps 104 and 105 are repeatedly executed, and when the time t2 of FIG. 6 is reached, Steps 106 and 107 are executed successively.

In Step 106, the microcomputer of the electric control apparatus ECU stores the time elapsed until a "Yes" determination is made in Step 105 after execution of Step 103; i.e., the pressure decreasing time td between times t1 and t2 of FIG. 6. Further, the microcomputer starts an internal timer in Step 107, and determines in Step 108 whether or not the wheel assembly B is rotating, on the basis of an output (wheel speed Vw) from the wheel speed sensor S2. When the microcomputer makes a "Yes" determination in Step 108, the microcomputer executes Steps 109 and 110 successively. When the microcomputer makes a "No" determination in Step 108, the microcomputer executes Step 110 without performing Step 109.

In Step 109, the count value of the timer is incremented so as to measure the time elapsed after execution of Step 107. In Step 110, the microcomputer of the electric control apparatus ECU determines whether or not the internal switch of the stroke sensor S1 has been switched from the OFF state to the ON state, on the basis of the signal output from the stroke sensor S1. When the microcomputer makes a "No" determination in Step 110, the microcomputer returns to Step 108 so as to execute Step 108. When the microcomputer makes a "Yes" determination in Step 110, the microcomputer executes Step 111 and an air-flow-rate calculation routine 200.

Therefore, until the pressure control valve 30 is switched from the permission state (OFF state) to the prohibition state (ON state) after time t2 of FIG. 6; i.e., until time t3 of FIG. 6 comes, Steps 108 to 110 are repeatedly executed when the wheel assembly B is rotating. When the time t3 of FIG. 6 is reached, Step 111 and the air-flow-rate calculation routine 200 are executed successively. Notably, during the period between times t2 and t3 of FIG. 6, when the wheel assembly B is in a stopped state (when the air pump AP is not driven), Steps 108 and 110 are executed successively.

In Step 111, the microcomputer of the electric control apparatus ECU stores the time elapsed until a "Yes" determination is made in Step 110 after execution of Step 107; i.e., the pressure increasing time tu between times t2 and t3 of FIG. 6. Further, in the air-flow-rate calculation routine 200, Steps 201 to 209 shown in FIG. 5 are executed.

In Step 201 of FIG. 5, the microcomputer of the electric control apparatus ECU calculates an air quantity decreasing rate Qd (=(M2−M1)/td), which is a rate of decrease of the air quantity within the pneumatic circuit during the pressure decreasing time td, from the pressure decreasing time td and the air quantity difference (M2−M1), which is the difference between a quantity M2 of air remaining in the pneumatic circuit, including the tire air chamber Rb, at the time the tire pressure is the upper limit set value P2 (e.g., at time t1 of FIG. 6) and a quantity M1 of air remaining in the pneumatic circuit at the time the tire pressure is the lower limit set value P1 (e.g., at time t2 of FIG. 6).

Moreover, in Step 202, the microcomputer of the electric control apparatus ECU determines whether or not the above-mentioned air quantity decreasing rate Qd; i.e., a leakage air flow rate, is less than the set value Qdo. When the microcomputer makes a "Yes" determination in Step 202, the microcomputer executes 205 after execution of Step 203. When the microcomputer makes a "No" determination in Step 202, the microcomputer executes 205 after execution of Step 204. In Step 203, the microcomputer issues an instruction for displaying a message "Air Leakage: Normal," whereby the message "Air Leakage: Normal" is displayed on the instrument panel display section ID. In Step 204, the microcomputer issues an instruction for displaying a message "Air Leakage: Anomalous," whereby the message "Air Leakage: Anomalous" is displayed on the instrument panel display section ID. Thus, a driver can be informed of the state (normal/anomalous) of air leakage from the pneumatic circuit including the tire air chamber Rb.

In Step 205 of FIG. 5, the microcomputer of the electric control apparatus ECU calculates an air quantity increasing rate Qu (=(M2−M1)/tu), which is a rate of increase of the air quantity within the pneumatic circuit during the pressure increasing time tu, from the pressure increasing time tu and the air quantity difference (M2−M1), which is the difference between a quantity M2 of air remaining in the pneumatic circuit, including the tire air chamber Rb, at the time the tire pressure is the upper limit set value P2 (e.g., at time t3 of FIG. 6) and a quantity M1 of air remaining in the pneumatic circuit at the time the tire pressure is the lower limit set value P1 (e.g., at time t2 of FIG. 6). Further, in Step 206, the microcomputer calculates an air flow rate Q (=Qd+Qu), which is the flow rate of air discharged from the air pump AP to the tire air chamber Rb between times t1 to t3, from the air quantity decreasing rate Qd and the air quantity increasing rate Qu.

Moreover, in Step 207, the microcomputer of the electric control apparatus ECU determines whether or not the above-mentioned discharged air flow rate Q is greater than the set value Qo. When the microcomputer makes a "Yes" determination in Step 207, the microcomputer returns to Step 103 of FIG. 5 after execution of Step 208. When the microcomputer makes a "No" determination in Step 207, the microcomputer returns to Step 103 of FIG. 5 after execution of Step 209. In Step 208, the microcomputer issues an instruction for displaying a message "Discharge Function: Normal," whereby the message "Discharge Function: Normal" is displayed on the instrument panel display section ID. In Step 209, the microcomputer issues an instruction for displaying a message "Discharge Function: Anomalous," whereby the message "Discharge Function: Anomalous" is displayed on the instrument panel display section ID. Thus, a driver can be informed of the state (normal/anomalous) of the discharge function of the air pump AP.

In the above-described embodiment, the present invention is applied to a tire-pressure control apparatus which includes the air pump AP driven through rotation of the wheel assembly B attached to the axle hub 11. However, the present invention can be similarly applied to a tire-pressure control apparatus which includes an air pump driven by an electric motor mounted on the vehicle body. In this case, operation of the electric motor must be synchronized with operation of the pressure control valve 30 (it is necessary to drive the motor when the pressure control valve 30 is in the permission state and to step the motor when the pressure control valve 30 is in the prohibition state); however, the wheel speed sensor S2 and Step 108 of FIG. 4 become unnecessary.

In the above-described embodiment, the temperature of air within the pneumatic circuit is assumed not to change (is assumed to remain at a predetermined value) for calculation of the quantity M2 of air remaining in the pneumatic circuit at the time the pressure control valve 30 enters the prohibition state (e.g., time t1 in FIG. 6) (calculation by use of the state equation of gas P·V=M·R·T) and calculation of the quantity M1 of air remaining in the pneumatic circuit at the time the pressure control valve 30 enters the permission state (e.g., time t2 in FIG. 6). However, the embodiment may be configured to accurately calculate the remaining air quantities M1 and M2 by use of a temperature sensor capable of detecting the temperature of air.

The above-described embodiment is configured to display the results of the determinations in Steps 202 and 207 on the instrument panel display section ID to thereby inform a driver of the results of the determinations. However, the embodiment may be modified to inform the driver of the results of the determinations in Steps 202 and 207 by means of an annunciating sound from a speaker.

In the above-described embodiment, the pressure decreasing time (td) is shown to be about 2.5 times the pressure increasing time (tu) in FIG. 6. This shows a state in which air leaks from the pneumatic circuit, including the tire air chamber Rb (Air Leakage: Anomalous), and when no air leaks from the pneumatic circuit (Air Leakage: Normal), the pressure decreasing time (td) becomes very long as compared with the pressure increasing time (tu). Further, in the above-described embodiment, the present invention is applied to a tire-pressure control apparatus not equipped with a pressure sensor. However, the present invention can be applied to a tire-pressure control apparatus equipped with a pressure sensor so as to serve as a backup when the pressure sensor experiences failure.

The invention claimed is:

1. A tire-pressure control apparatus comprising:
   an air pump capable of supplying compressed air to a tire air chamber of a wheel assembly;
   a mechanical control valve device disposed in an air passageway extending between the air pump and the tire air chamber and adapted to control a tire pressure within the tire air chamber, the control valve device being in a permission state where the control valve device permits supply of compressed air from the air pump to the tire air chamber during a period over which the tire pressure increases to an upper limit set value from a lower limit set value after having decreased to the lower limit set value, and being in a prohibition state where the control valve device prohibits supply of compressed air from the air pump to the tire air chamber during a period over which the tire pressure decreases to the lower limit set value from the upper limit set value after having increased to the upper limit set value;
   a value state detection sensor for detecting whether the control valve device is in the permission state or the prohibition state;
   time measurement means for measuring a pressure decreasing time, which is a time period starting when the control valve device enters the prohibition state and ending when the control valve device enters the permission state, and a pressure increasing time, which is a time period starting when the control valve device enters the permission state and ending when the control valve device enters the prohibition state; and
   discharged-air-flow-rate calculation means for calculating a flow rate of air discharged from the air pump to the tire air chamber from the pressure decreasing time and the pressure increasing time.

2. A tire-pressure control apparatus according to claim 1, wherein the discharged-air-flow-rate calculation means includes:
   air-quantity-increasing-rate calculation means for calculating an air quantity increasing rate, which is a rate of increase in the quantity of air within the pneumatic circuit, including the tire air chamber, during the pressure increasing time, from the pressure increasing time and an air quantity difference, which is the difference between an amount of air remaining within the pneumatic circuit when the control valve device enters the prohibition state and an amount of air remaining within the pneumatic circuit when the control valve device enters the permission state;
   air-quantity-decreasing-rate calculation means for calculating an air quantity decreasing rate, which is a rate of decrease in the quantity of air within the pneumatic circuit during the pressure decreasing time, from the pressure decreasing time and the air quantity difference; and
   supplied-air-flow-rate calculation means for calculating a flow rate of air discharged from the air pump toward the tire air chamber on the basis of the air quantity increasing rate and the air quantity decreasing rate.

3. A tire-pressure control apparatus according to claim 2, further comprising:
   flow-rate determination means for determining whether or not the flow rate of air discharged from the air pump to the tire air chamber is greater than a set value; and
   announcing means for announcing results of determination by the flow-rate determination means.

4. A tire-pressure control apparatus according to claim 1, further comprising:
   flow-rate determination means for determining whether or not the flow rate of air discharged from the air pump to the tire air chamber is greater than a set value; and
   announcing means for announcing results of determination by the flow-rate determination means.

* * * * *